United States Patent [19]

Latimer et al.

[11] Patent Number: 5,255,371
[45] Date of Patent: Oct. 19, 1993

[54] APPARATUS FOR INTERFACING A REAL-TIME COMMUNICATIN LINK TO AN ASYNCHRONOUS DIGITAL COMPUTER SYSTEM BY UTILIZING GROUPED DATA TRANSFER COMMANDS

[75] Inventors: Robert A. Latimer, Plymouth Meeting; David W. Heileman, Jr., West Chester, both of Pa.

[73] Assignee: Unisys Corporation, Blue Bell, Pa.

[21] Appl. No.: 503,195

[22] Filed: Apr. 2, 1990

[51] Int. Cl.$^5$ .......................... G06F 3/00; G06F 13/00
[52] U.S. Cl. .................................... 395/250; 395/375;
364/DIG. 1; 364/239.7; 364/262.5
[58] Field of Search ............................... 395/250, 375;
364/200 MS File, 900 MS File

[56] References Cited

U.S. PATENT DOCUMENTS

| 3,585,600 | 6/1971 | Saltini | 395/375 |
| 3,781,807 | 12/1973 | Saltini | 395/375 |
| 3,881,173 | 4/1975 | Larsen et al. | 395/375 |
| 4,415,970 | 11/1983 | Swenson et al. | 395/425 |
| 4,635,194 | 1/1987 | Burger et al. | 395/375 |
| 4,742,454 | 5/1988 | Robinson et al. | 395/250 |
| 4,754,399 | 6/1988 | Yamamoto et al. | 395/250 |
| 4,775,927 | 10/1988 | Hester et al. | 395/375 |
| 4,788,638 | 11/1988 | Ogawa et al. | 395/250 |
| 4,928,225 | 10/1990 | McCarthy et al. | 395/425 |
| 4,949,303 | 8/1990 | Hoshino et al. | 395/250 |
| 5,016,169 | 5/1991 | Koya et al. | 395/375 |
| 5,043,880 | 8/1991 | Yoshida | 395/375 |
| 5,046,039 | 9/1991 | Ugajin et al. | 395/250 |
| 5,150,470 | 9/1992 | Hicks et al. | 395/375 |
| 5,151,981 | 9/1992 | Wescott et al. | 395/375 |
| 5,155,810 | 10/1992 | McNamara, Jr. et al. | 395/250 |
| 5,155,814 | 10/1992 | Beardsley et al. | 395/275 |

Primary Examiner—Robert L. Richardson
Assistant Examiner—Lance L. Barry
Attorney, Agent, or Firm—Albert B. Cooper; Mark T. Starr

[57] ABSTRACT

An interface between a real-time data link and a digital computer system utilizes data buffers between the computer central data storage and the data link. An interface control processor is responsive to a Data Transfer Command set comprising a SEND, a GET, a SET-TAG and a TERMINATE command. The commands include a TAG parameter that is set by the SET-TAG command to group sequences of SEND and GET commands so that logical streams of data are continuously transmitted and received across the interface. The SEND command includes a RECEIVE parameter to initiate the transfer of received data from the data link to the buffers after all data associated with the SEND command has been transmitted. Data transmission and reception operations are terminated by a TERMINATE command with a TAG parameter matching the TAG parameters of the sequence of commands controlling the operations. The SEND, GET and SET-TAG commands are stacked in a command queue and applied sequentially to the control processor. The TERMINATE command bypasses the command queue and is applied directly to the control processor for terminating operations associated with a sequence of commands with matching TAG parameters. In response to SEND, data is transferred from central data storage to the buffers for transmission to the data link. In response to GET, received data is transferred from the buffers to the central data storage. A buffering strategy maintains the buffers as full as possible during data transmission and as empty as possible during data reception.

16 Claims, 2 Drawing Sheets

APPARATUS FOR INTERFACING A REAL-TIME COMMUNICATIN LINK TO AN ASYNCHRONOUS DIGITAL COMPUTER SYSTEM BY UTILIZING GROUPED DATA TRANSFER COMMANDS

BACKGROUND OF THE INVENTION

1. Field of the Invention

The invention relates to communication interfaces, particularly with respect to interfacing a real time communication link with a non-real time, asynchronous, command-oriented digital computer system.

2. Description of the Prior Art

Data processing and communication systems are in common usage where a real-time communication link interfaces with a digital computer system running application software. Typical digital computers operate in an asynchronous, nonreal-time and command-oriented environment. The data messages flow from the computer system to the link and from the link to the computer system through the interface therebetween. Such interfacing requirements exist in, for example, process control systems, laboratory data communications systems and voice messaging systems. For example, such an interface is required in computer controlled telephone systems that provide services such as Call Answer, Voice Mail, Voice Store and Forward and the like. In telephonic systems of this type, the environment on the communication or data link side of the interface is real-time and generally synchronous where the data transmitted and received over the data link is a full duplex, Pulse Code Modulation (PCM) representation of the voice band signals. On the other hand, the environment on the computer side of the interface is asynchronous, command oriented and nonreal-time where the application software running on the system has ultimate control over the flow of data through the interface. In such telephonic systems, the data tends to be of high rate and large volume where all of the voice data entered by users into the system must be acquired without the possibility of retry or retransmission. Additionally, digital voice messages stored in the computer system must be transported through the interface to the user in a continuous, real-time stream under control of the application software which is asynchronously executing in nonreal-time.

A prior art technique for providing a real-time interface of the type described, utilized application softward designed to poll the data link interface at a predetermined rate. The application must guarantee the polling rate to match the message rate requirements of the link. Such an interface suffers from the disadvantage of requiring the software to be tightly coupled to data link characteristics such as data size, data link protocol, timing and the like. The polling software must, for example, be responsive to such data link protocol as the particular Data Available and Data Required indicia as well as the Start and End Message flags utilized on the link in order to effect proper operation. Such limitations and restrictions on the application software tend to render portability of the application to different systems impractical, if not impossible. Changes in the data link characteristics may require extensive time consuming and hence expensive modifications to the application software. A digital computer system executing software that polls the data link interface with a guaranteed rate also suffers from the disadvantage of requiring excess buffering. The primary disadvantage to the technique, however, is that the software must be tightly coupled to the data link interface operation. Additionally, the ability to perform other operations beyond controlling a single data link is severely constrained by the timing requirements imposed by the data link interface. While the computer system is operating a data link, concurrent processing of another application or interface is rendered extremely difficult. The software for operating in this manner is very difficult to write and to maintain.

Another prior art technique for providing a real-time interface of the type described involves the digital computer system processing the data link interface as a result of interrupts received from the data link. This prior art interface again requires the application software to be tightly coupled to the data link characteristics with the concomitant disadvantages described above. The application software must be specifically written to process the particular interrupt protocol of the data link. Additionally, the latency associated with the computer system interrupts is a critical factor in maintaining proper operation of the data link. Elaborate and expensive buffering such as cache memory systems may be required to reduce latency time to a value commensurate with operating a present day, high speed digital data link. A digital computer system processing a data link interface as a result of processing interrupts provides the capability of processing one or more data link interfaces in a time-sharing manner along with applications or other interfaces on the computer system. A computer that is "interrupted" from its current processing task provides real-time service to a data link interface and thereafter returns to processing the interrupted task. When utilizing this approach, the software becomes less coupled to the data link operation, compared to the approach described above, by providing service to the data link interface in a coordinated manner only when required. Disadvantages to this approach, however, include interrupt latency, processing overhead, and software dependency. The maximum latency to respond to an interrupt can be significant. Since the data link interface must have the capability to tolerate this maximum latency, bandwidth limitations may be imposed upon the data link or performance requirements upon the computer system. Processing overhead associated with an interrupt driven scheme can be enormous. Each time an interrupt is issued to service the data link interface, the processing resource is utilized not only to provide service to the data link, but must also participate in at least the two processing context switches of interrupted task-to-data link service and data link service-to-interrupted task. The software associated with processing the data link interrupts must have intimate knowledge of the data link operation. Such software is difficult to write and maintain.

Another prior art technique for providing a real-time interface of the type described, is where data link interface data transfers are directly effected between the link and the computer system central data storage via a Direct Memory Access (DMA) technique. Such DMA systems generally require the application software to be tightly coupled to the data link characteristics with the concomitant disadvantages discussed above. Such systems usually do not utilize storage hierarchy that would otherwise provide buffering between the data source/destination and the central data storage. Without a storage hierarchy, the overhead of unbuffered DMA transactions on the central data storage can be undesirably high especially in high data rate and high data volume environments, or in highly pipelined central data storage systems. Specifically, many high performance computer systems utilize a DMA technique for transferring data between an interface and a memory subsystem while retaining interrupts or polling for a higher level of data link interface control. This permits the data transfers from the data link to the memory, as opposed to the control of the data link, to be effected without intervention from processing software. However, this approach has disadvantages including the lack of storage hierarchy and software dependency. The lack of storage hierarchy requires significant overhead, both in hardware and time, to permit small DMA transactions on the memory. This disadvantage is especially significant in systems with multiple interfaces each requiring DMA to the memory and/or highly pipelined memory systems. Although the data transfer responsibilities have been removed from the computer system, the details of the DL interface, such as DMA operation therewith and DL protocol, still burden the computer system software. Notwithstanding the above, such DMA systems are usually not utilized on large computers with channel architectures because of excessive memory and associated circuitry cost.

A disadvantage suffered by all of the prior art techniques discussed above, is the inability to minimize the turn-around delay between sending data to, and receiving data from a data link.

SUMMARY OF THE INVENTION

The above disadvantages of the prior art are obviated by apparatus that interfaces a real-time data link to a digital computer system, the digital computer system including central data storage. A data buffer couples the data link to the central data storage for buffering data to be sent from central data storage to the data link and for buffering data received from the data link to be sent to central data storage. Processor means coupled to the central data storage and to the data link processes a SEND command, a GET command, a TERMINATE command and a SET-TAG function with each command having a TAG parameter. The processor means controls sending data from central data storage to the data buffer in response to the SEND command, getting data from the data buffer to central data storage in response to the GET command, setting the TAG parameter of a sequence of commands to a common value in response to the SET-TAG function, and terminating operations controlled by the commands in response to the TERMINATE command. Preferably, the SEND and GET commands are stacked in a command queue for processing. The TERMINATE command bypasses the command queue. The SET-TAG function is preferably implemented as a command or as a parameter of a command, such as the SEND command.

DESCRIPTION OF THE PREFERRED EMBODIMENTS

Figure 1:
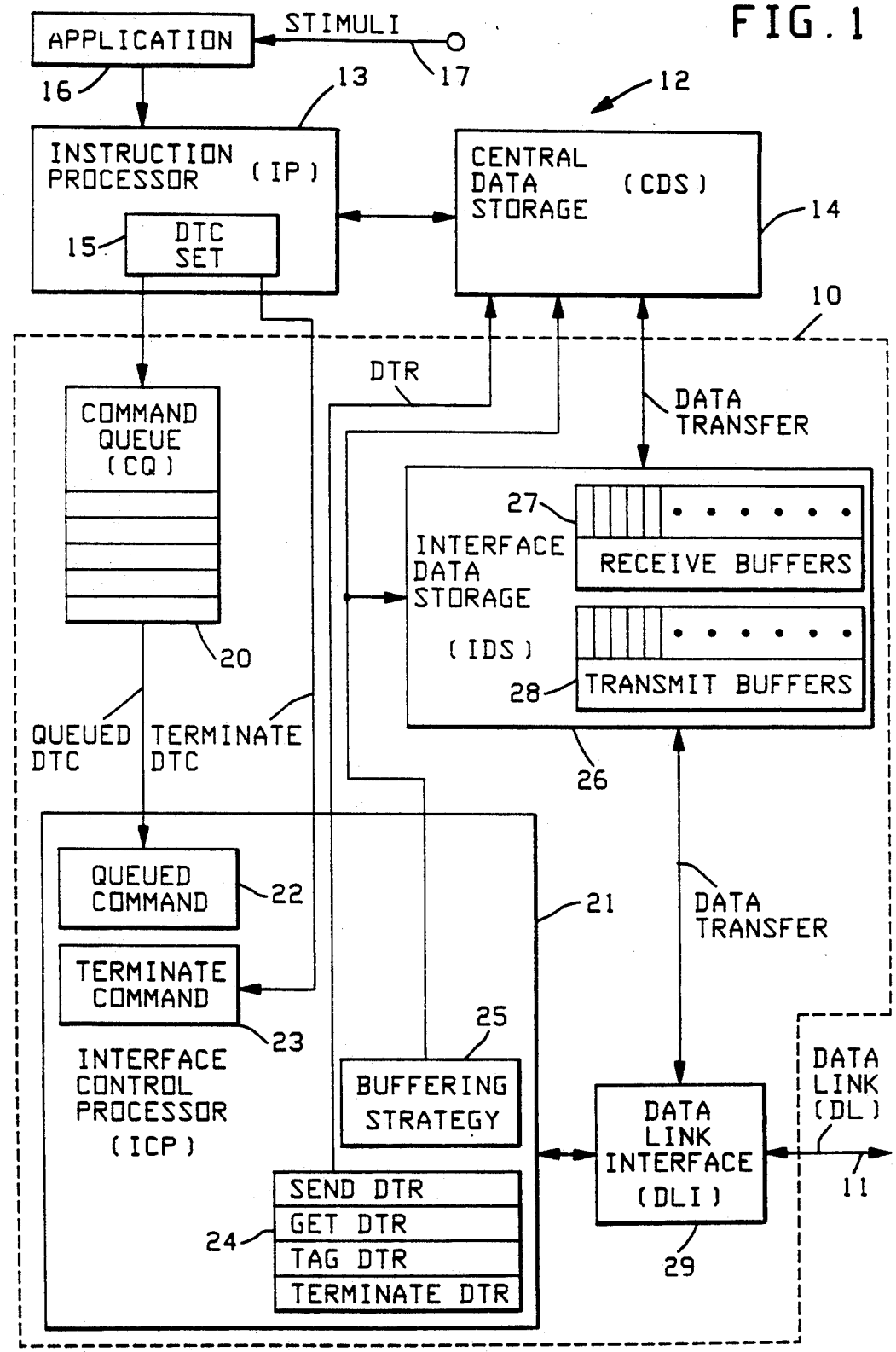
FIG. 1 is a schematic block diagram of a preferred embodiment of the interface of the present invention.

Referring to FIG. 1, a Data Transfer Command (DTC) Interface 10 implemented in accordance with the present invention is illustrated. The Interface 10 couples a Data Link (DL) 11 with a host computer system generally indicated at 12. The DL 11 is a communication link on which data of interest is sent/received and may be of any conventional form including one or more of the following: asynchronous or synchronous data stream, full/half/simplex connectivity and with or without embedded protocol. The host 12 includes an Instruction Processor (IP) 13 and a Central Data Storage (CDS) 14. The IP 13 is a data processing entity that performs tasks or applications utilizing data transferred over the DL 11. The IP 13 schematically includes a set 15 of Data Transfer Commands (DTC) to be further described with respect to FIG. 2. The host 12 is illustrated running an application 16 that exercises ultimate control over the data transferred between the host 12 and the Data Link 11. The application 16 is responsive to external stimuli schematically represented at 17. For example, if the DL 11 links to a telephone network and the application 16 is a Call Answer program, the stimuli 17 may comprise off-hook and busy or ring-no-answer with the telephone system central office switch connecting the calling party to the Data Link 11. The application 16 may instruct the IP 13 to issue a sequence of DTCs that will result in sending a voice prompt to the caller that the caller may leave a message at the tone, sending a tone over the DL 11 and receiving the voice message from the caller.

The Interface 10 includes a Command Queue (CQ) 20 that receives and stacks a sequence of DTCs issued from the IP 13. An Interface Control Processor (ICP) 21 sequentially receives the queued DTCs from the CQ 20 as schematically represented at 22. The CQ 20 is a FIFO queuing arrangement in which the IP 13 issues a sequence of DTCs that are executed by the ICP 21 individually without intervention of the IP 13. The ICP 21 also receives a TERMINATE DTC directly from the IP 13 bypassing the CQ 20. The TERMINATE DTC is received by the ICP 21 as schematically indicated at 23. The ICP 21 issues Data Transfer Results (DTR) to the CDS 14 as schematically indicated at 24. The IP 13 is appropriately notified when the ICP 21 issues the DTR to the CDS 14. The ICP 21 issues a DTR corresponding to each of the DTC types; viz, SEND, GET, TAG and TERMINATE to be described below in further detail. The ICP 21 also includes a buffering strategy control 25 to be further explained below.

The Interface 10 includes Interface Data Storage (IDS) 26 which comprises a data storage device where data to/from the DL 11 is buffered. The IDS 26 includes receive buffers 27 for buffering data received from the DL 11 to be stored in the CDS 14 and transmit buffers 28 for buffering data to be sent from the CDS 14 to the DL 11. The amount of storage provided by the receive buffers 27 and the transmit buffers 28 must be adequate to maintain a buffering strategy, as controlled by the buffering strategy control 25, between the CDS 14 and the IDS 26 which prevents starving the DL 11 when sending data or overrunning the IDS 26 when receiving data.

The Interface 10 further includes a Data Link Interface (DLI) 29 comprising an entity which provides interface capability between the DL 11 and the IDS 26. The DLI 29 may include one or more of the following techniques: serial/parallel conversion, DL protocol, coding technique and electrical conversion. The coding techniques may, for example, comprise Pulse Code Modulation (PCM) and the electrical conversion may comprise such techniques as digital-to-analog and analog-to-digital conversion.

The CDS 14 comprises a data storage device from which the IP 13 utilizes data received from the DL 11, generates data to be sent over the DL 11, or examines the DTR of DTCs issued to the ICP 21. The ICP 21 comprises a control entity which receives, performs, and acknowledges DTCs from the IP 13; coordinates data transfer between the CDS 14 and the IDS 26; and performs data transfer between the DLI 29 and the IDS 26. The CDS 14 and IDS 26 are responsive to the buffering strategy control 25 to effect data transfer coordination therebetween.

The objective of data transfer to/from the CDS 14 over the DL 11 through the DTC interface 10 is accomplished through the use of DTCs issued from the IP 13 to the ICP 21. The four commands of the DTC command set 15 (SET-TAG, SEND, GET, and TERMINATE) provide capability for the IP 13 to communicate over the DL 11 while remaining decoupled from the operating details of the DL 11.

All DTC, except TERMINATE, are sent to the ICP 21 through the CQ 20. If the ICP 21 is not already executing a DTC, a DTC is transferred from the CQ 20 to the ICP 21. When the ICP 21 completes processing of any DTC, a Data Transfer Result (DTR) is issued and stored in the CDS 14 as status information which the IP 13 can examine after being notified. In this manner, the ICP 21 is sequentially and continuously processing single DTCs from the CQ 20 as long as DTCs remain in the CQ 20.

The TERMINATE DTC is not sent to the ICP 21 through the CQ 20. Instead, TERMINATE is sent directly from the IP 13 to the ICP 21 as an immediate command. The ICP 21 continuously awaits the direct arrival of the TERMINATE DTC from the IP 13 notwithstanding concurrent execution of a DTC from the CQ 20. The functions of TERMINATE, to be described below, are performed immediately with processing of a DTC issued from the CQ 20 being suspended, a DTR for the TERMINATE command being returned to the CDS 14 and the IP 13 being notified.

Figure 2:
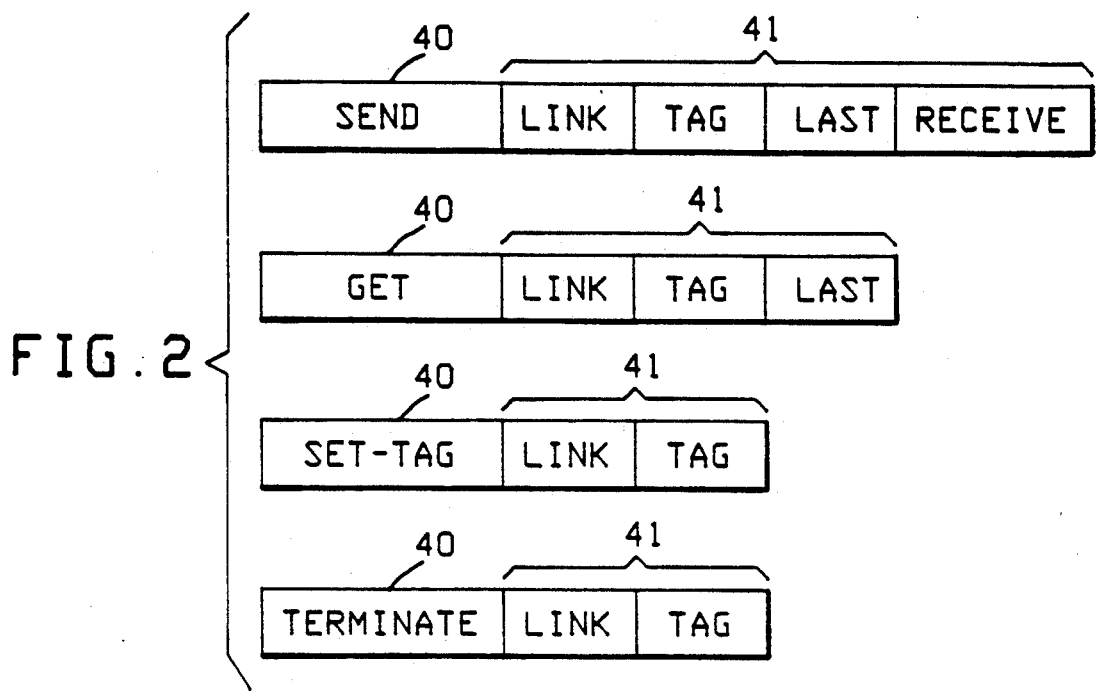
FIG. 2 is a diagram illustrating the formats of the commands of the Data Transfer Command (DTC) set of the present invention.

As discussed above, the DTC set 15 is comprised of SEND, GET, SET-TAG, and TERMINATE. Referring to FIG. 2, the formats of the DTCs are illustrated. Each of the DTCs has an op code field 40 and parameter fields 41 that contain the parameters associated with the command.

Referring to FIGS. 1 and 2, the SEND DTC transfers data stored in the CDS 14 to the DL 11. The SEND DTC has four associated parameters: LINK, TAG, LAST, and RECEIVE. The LINK parameter provides information to the ICP 21 on appropriate use of the CDS 14. The LINK parameter may contain a CDS pointer providing an address in the CDS 14 at which information may be found, such as the address in the CDS 14 of the data to be sent, the amount of the data to be sent, and the address in the CDS 14 for storing the DTR. Alternatively, the Link parameter itself may contain the information. The TAG parameter provides information to the ICP 21 with respect to grouping separate DTC operations into logical entities. The LAST parameter, which is boolean, informs the ICP 21 that the data associated with the current SEND DTC completes transmission activity to the DL 11. The RECEIVE parameter, which is boolean, directs the ICP 21 to begin receiving data from the DL 11 after the data associated with the current SEND DTC completes transmission to the DL 11.

During a SEND operation, the transmit buffers 28 in the IDS 26 will be maintained as full as possible according to a buffering strategy, to be described below, between the CDS 14 and the IDS 26 as controlled by the buffering strategy control 25. Maintaining the IDS transmission buffers 28 full allows the IDS buffering to absorb latency anticipated in implementing the buffering strategy. To avoid transmission underrun, the buffering strategy must be able to absorb anticipated latency and sustain an average transmission rate equivalent to the transmission rate of the DL 11.

When a SEND completes the transfer of associated data from CDS 14 with the LAST and RECEIVE parameters FALSE, a SEND DTR from the DTR block 24 is issued by the ICP 21 while the buffered data continues to be sent over the DL 11. This allows for the next SEND DTC in the CQ 20 to be processed by the ICP 21 so as to continue transmitting data over the DL 11 without interruption.

When a SEND completes the transfer of associated data from the CDS 14 with the LAST parameter TRUE and the RECEIVE parameter FALSE, the DTR is not issued until all buffered data has been sent over the DL 11. This allows for the SEND DTR to provide synchronization of, and to indicate confirmation of, data transmission completion.

When a SEND completes the transfer of associated data from the CDS 14 with the RECEIVE parameter TRUE, the DTR is not issued until all buffered data has been sent over the DL 11. Once the DTR is issued, data received from the DL 11 will begin to be buffered in the receive buffers 27 of the IDS 26. This technique provides the ability to initiate receiving data from the DL 11 without introducing large processing or communication delays between the termination of sending data over the DL and receiving data from the DL.

The operation of a SEND DTC in progress can be modified by a TERMINATE DTC or an internal terminating condition, such as DL protocol, in a manner to be described in further detail below.

The GET DTC transfers to the CDS 14 receive data buffered from the DL 11 in the receive buffers 27 of the IDS 26. Reception is only initiated as the result of the RECEIVE parameter of a previous SEND DTC being set to TRUE. The GET DTC has three associated parameters: LINK, TAG, and LAST. The LINK parameter provides information to the ICP 21 on appropriate use of the CDS 14. The LINK parameter may contain a CDS pointer to a location in the CDC 14 containing such information as the address in the CDS 14 of the location to store the receive data, the maximum amount of data to store, and the address for storing the DTR. Alternatively, the LINK parameter itself may contain the information. The TAG parameter provides information to the ICP 21 with respect to grouping separate DTC operations into logical entities. The LAST parameter, which is boolean, directs the ICP 21 that DL reception and buffering must conclude with the current GET DTC.

During a GET operation and after data reception has been initiated pursuant to a previous RECEIVE, the receive buffers 27 in the IDS 26 will be maintained as empty as possible according to the buffering strategy between the CDS 14 and the IDS 26 to be further described below. The buffering strategy is controlled by the buffering strategy control 25. Maintaining the receive buffers 27 of the IDS 26 as empty as possible, allows the IDS buffering to absorb latency anticipated in implementing the buffering strategy. To avoid receive buffer overrun, the buffering strategy must absorb anticipated latency and sustain an average transfer rate equivalent to the DL reception rate.

When a GET completes the transfer of associated data from the IDS 26, and the LAST parameter is FALSE, a GET DTR is issued from the DTR block 24 of the ICP 21 and receive data continues to be buffered from the DL 11. This allows for additional buffered data to be received from the DL 11 by the next GET DTC in the CQ 20 without interruption.

When a GET completes the transfer of associated data from the IDS 26 and the LAST parameter is TRUE, receiving buffering is stopped (if not already stopped by TERMINATE) and a DTR is issued. The DTR includes the additional status information that the receive operation was completed by the LAST parameter.

A RECEIVE operation in progress can be modified by a TERMINATE DTC or an internal terminating condition, such as DL protocol, in a manner to be described below.

The SET-TAG DTC establishes a working TAG identifier for a following sequence or group of SEND and GET DTCs. The SET-TAG DTC has two associated parameters: LINK and TAG. The LINK parameter provides information to the ICP 21 with respect to appropriate use of the CDS 14. The LINK parameter could include such information (or a pointer to such information) as the address for storing the DTR. The TAG parameter indicates the specific working TAG identifier associated with the SEND and GET DTCs that follow the SET-TAG DTC.

The TERMINATE DTC causes the ICP 21 to possibly modify the behavior of the currently processing SEND DTC or data reception operation. The TERMINATE DTC has two associated parameters: LINK and TAG. The LINK parameter provides information to the ICP 21 with respect to the appropriate use of the CDS 14. The LINK parameter could include such information (or a pointer to such information as the address for storing the DTR. The TAG parameter indicates the specific group of DTCs that the TERMINATE DTC should address.

If a SEND DTC is currently in progress by the ICP 21 and the working TAG does not match the TAG parameter of the TERMINATE, the TERMINATE DTR is issued by the ICP 21 from the block 24.

If a SEND DTC is currently in progress by the ICP 21 and the working TAG matches the TAG parameter of the TERMINATE, the following sequence of actions are controlled by the ICP 21:
1) The TERMINATE DTR is issued.
2) The transmission of data through the DL 11 from the IDS 26 is immediately stopped and all data buffered in the IDS 26 is discarded.
3) The SEND DTR is issued. Status information in the SEND DTR can include information regarding the state of transmission such as the amount of data transmitted and the termination reason.
4) All other DTCs in the CQ 20 with a TAG parameter which matches the working TAG will cause an immediate DTR to be issued without performing any communication activity. The status information in the DTR indicates this condition.

If a data reception operation is currently in progress by the ICP 21 and the working TAG does not match the TAG parameter of the TERMINATE, the TERMINATE DTR is issued.

If a data reception operation is currently in progress by the ICP 21 and the working TAG matches the TAG parameter of the TERMINATE, the following sequence of actions are controlled by the ICP 21:
1) The TERMINATE DTR is issued.
2) The reception of additional data from the DL 11 to the IDS 26 is immediately stopped.
3) The transfer to the CDS 14 of receive data already buffered in the receive buffers 27 of the IDS 26 continues through the current and possibly following GET DTC(s). This operation is referred to as a receive buffer purge.
4) When the receive buffer purge is complete, all following DTCs with a TAG parameter that matches the working TAG will cause an immediate DTR to be issued without performing any communication activity. The DTR status information will indicate this condition.

As described above, external stimuli 17 may be detected and interpreted by the application 16 as requiring the termination of data being sent out over the DL 11 or being received therefrom. The application 16 instructs the IP 13 to issue a TERMINATE DTC with the TAG set for the currently executing sequence of SEND and GET DTCs in the CQ 20. Alternatively, an internal termination may be effected by the ICP 21 recognizing conditions of DL communication, such as DL protocol, which require the processing of SEND and GET DTCs to be modified. For example, in a telephone network environment, a DTMF digit entered by a caller over the DL 11 may be recognized by the ICP 21 as requiring immediate termination of voice data transmission.

Actions executed in response to internal termination conditions are exactly equivalent to those that are performed for a TERMINATE DTC with a TAG value equal to the DTC currently being executed, except that no TERMINATE DTR is issued.

With continued reference to FIG. 1, a buffering strategy implemented by the buffering strategy control 25 to minimize underrun of the transmit buffers 28 during a data transmitting operation and overrun of the receive buffers 27 during a data receiving operation, will now be described. The receive buffers 27 and transmit buffers 28 each comprises a set of individually actuatable buffers. At the start of a SEND operation, the buffering strategy control 25 prefetches the number of bytes of SEND data to fill the transmit buffers 28 or the number of the bytes of available SEND data, whichever is less. When the current buffer empties, the buffering strategy control 25 rotates the buffers such that the next buffer becomes the current buffer. After a predetermined number of buffers are empty, the buffering strategy control 25 connects the IDS 26 to the CDS 14 to fetch further data to refill the emptied buffers. When receiving data, with respect to RECEIVE, after the current receive buffer is filled, buffer rotation occurs and the next receive buffer becomes the current buffer. After a predetermined number of buffers are filled, the buffering strategy control 25 controls the IDS 26 to send the data to the CDS 14, rendering the filled receive buffers empty and again available.

An example of a system utilizing the interface of the present invention will now be described. The example comprises a voice messaging scheme where data transmitted and received over the DL 11 is a full duplex, PCM representation of the voice band signals. The IP 13 maintains a data base of voice storage wholly or partially in the CDS 14 and generates DTCs to control the playback from and recording to this data base. The following scenario details a series of events whereby a voice prompt is played out and a message is recorded:

1) The following DTC are queued into the CQ by the IP for processing:

SET-TAG (LINK="a", TAG=1)
    This SET-TAG establishes the beginning of a group of SEND DTC which transmits the voice prompt data for recording a message.
SEND (LINK="b", TAG=1, LAST=FALSE, RECEIVE=FALSE)
    This SEND transmits the first portion of the voice prompt: "Hello. This is John Smith. I'm out of the office right now. Please".
SEND (LINK="c", TAG=1, LAST=FALSE, RECEIVE=FALSE)
    This SEND transmits the second portion of the voice prompt: "state message after the tone, when finished with your".
SEND (LINK="d", TAG=1, LAST=TRUE, RECEIVE=FALSE)
    This SEND transmits this third portion of the voice prompt: "message please press pound key."
SET-TAG (LINK="e", TAG=2)
    This SET-TAG establishes the beginning of a group of DTC which transmits a tone, initiates recording, and receives the recorded voice data.
SEND (LINK="f", TAG=2, LAST=FALSE, RECEIVE=TRUE)
    This SEND corresponds to the prompt tone: "beep", and the initiation of receiving voice data for recording.
GET (LINK="g", TAG=2, LAST=FALSE)
    This GET returns the first portion of received voice data.
GET (LINK="h", TAG=2, LAST=FALSE)
    This GET returns the second portion of received voice data.
GET (LINK="i", TAG=2, LAST=FALSE)
    This GET returns the third portion of received voice data.
GET (LINK="j", TAG=2, LAST=TRUE)
    This GET returns the fourth portion of received voice data.
SET-TAG (LINK="k", TAG=3)
    This SET-TAG establishes the beginning of a group of DTC which transmits a final concluding prompt.
SEND (LINK="l", TAG=3, LAST=TRUE, RECEIVE=FALSE)
    This SEND corresponds to the final prompt: "Thank you, Good-bye".

2) The ICP recognizes that the CQ is no longer empty, dequeues the first DTC, SET-TAG. This DTC establishes a new working tag, "1", for DTC processing. The ICP then returns a DTR for link "a".

3) The ICP dequeues the next DTC, SEND. The DTC fills the IDS transmit data buffers with data from the CDS to be transmitted. The transmission of data over the DL is started. As buffers within the IDS are emptied, additional data from the CDS is transferred to the IDS keeping the transmit buffers of the IDS as full as possible. Because LAST=FALSE, when all data associated with SEND have been transferred to the IDS, the ICP then returns a DTR for link "b" and continues to transfer data from the IDS over the DL.

4) The ICP dequeues the next DTC, SEND. The DTC continues to keep the IDS transmit data buffers filled with additional data to be transmitted.

5) The calling person, familiar with the voice messaging system and not desiring to hear the remainder of the voice prompting, presses a DTMF key to skip forward.

6) The ICP detects the DTMF digit as a DL protocol event and initiates "internal termination" actions. The transmission of the data buffered in the IDS over the DL is stopped and data buffered in the IDS is discarded. The DTR, link "c", is returned for the current SEND. The ICP dequeues the next DTC, SEND. Because the TAG matches the working tag "1" an immediate DTR is returned for link "d" without any transmission.

7) The ICP dequeues the next DTC, SET-TAG. This DTC establishes a new working tag, "2", for DTC processing. The ICP then returns a DTR for link "e".

8) The ICP dequeues the next DTC, SEND. The DTC then fills the IDS transmit data buffers with data from the CDS to be transmitted. The transmission of the data over the DL is started. As buffers within the IDS are emptied, additional data from the CDS is transferred to the IDS keeping the transmit buffers of the IDS as full as possible. Because RECEIVE=TRUE, when all data associated with SEND has been transferred to the IDS and this data has been sent over the DL, the ICP initiates recording and returns a DTR for link "f". Data received from the DL is buffered in the IDS.

9) The ICP dequeues the next DTC, GET. As the recording of voice proceeds and buffers within the IDS are filled, these IDS buffers are emptied from the IDS to the CDS. Because LAST=FALSE, when all data associated with this GET has been transferred to the CDS, the ICP returns a DTR for link "g".

10) The ICP dequeues the next DTC, GET. As the recording continues, additional IDS buffers are emptied to the CDS. Because LAST=FALSE, when all data associated with this GET has been transferred to the CDS, the ICP returns a DTR for link "h".

11) The ICP dequeues the next DTC, GET. As the recording continues, additional IDS buffers are emptied to the CDS.

12) The user recording the message completes the message and as directed presses the "#" DTMF key.

13) The ICP detects the "#" DTMF digit as a DL protocol event and initiates "internal termination" actions. The reception of data from the DL to the IDS is stopped. Receive data already buffered in the IDS continues to be emptied to the CDS. After all buffered data is emptied, the ICP returns a DTR for link "i". The ICP dequeues the next DTC, GET. Because the IDS buffers are empty and the TAG matches the working tag an immediate DTR is returned for link "j".

14) The ICP dequeues the next DTC, SET-TAG. This DTC establishes a new working tag, "3", for DTC processing. The ICP then returns a DTR for link "k".

15) The ICP dequeues the next DTC, SEND. The DTC fills the IDS transmit data buffers with data from the CDS to be transmitted. The transmission of data over the DL is started. As buffers within the IDS are emptied, additional data from the CDS is transferred to the IDS keeping the transmit buffers of the IDS as full as possible. Because LAST=TRUE, when all data associated with this SEND have been transferred to the IDS and all data has been sent over the DL, the ICP then returns a DTR for link "1".

16) The CQ now empty, the ICP awaits new DTC to arrive.

An example of utilization of the present invention is found in U.S. Pat. No. 5,133,004, issued Jul. 21, 1992, entitled "Digital Computer Platform for Supporting Telephone Network Applications", by D. W. Heileman, Jr., F. C. Kruesi, R. A. Latimer and T. L. Bennett, and assigned to UNISYS Corporation of Blue Bell, Pa., the assignee of the present invention.

Figure 3:
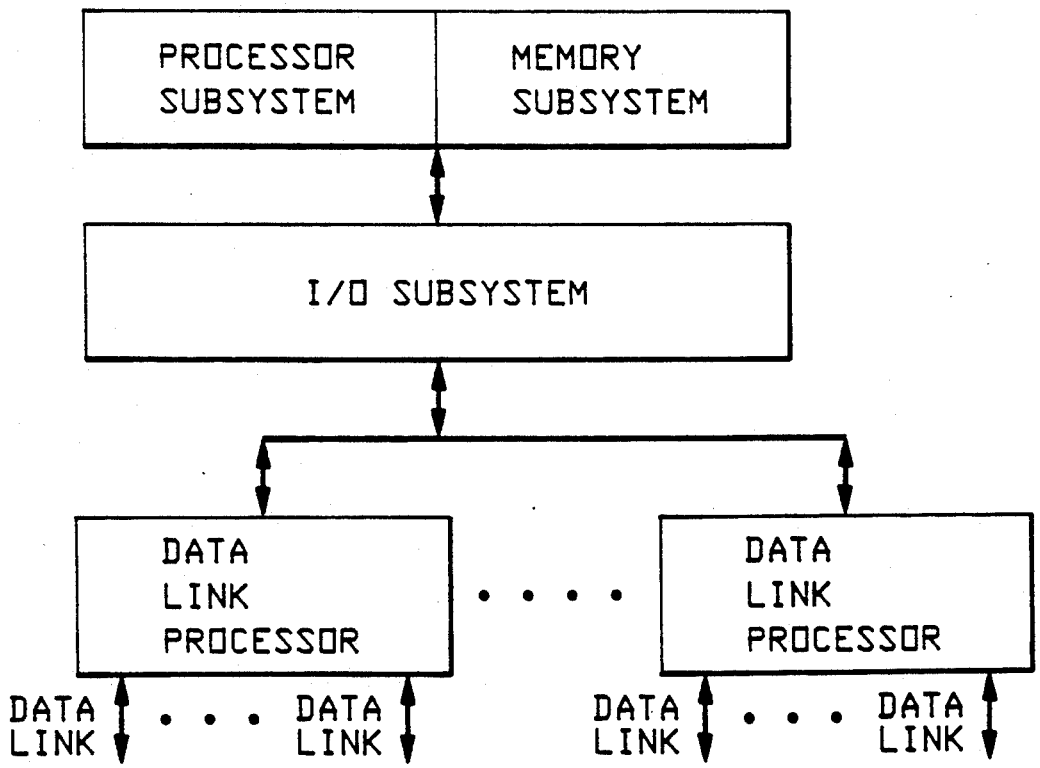
FIG. 3 is a schematic block diagram of a highly parallel computer system architecture into which the present invention may be embedded to form a highly parallel, alternative preferred embodiment thereof.

Referring to FIG. 3, a highly parallel form of an architecture in which the present invention may be embedded is illustrated. FIG. 3 depicts one possible representation of such an architecture and may be implemented as illustrated by the architecture of the A-Series digital computer systems available from said UNISYS Corporation. The A-Series architecture illustrated in FIG. 3 is described in detail in publications available from UNISYS Corporation; e.g., publication 1169943, December 1985, entitled "A-Series Physical I/O Overview". An approximate mapping of the arrangement of FIG. 1 onto the architecture of FIG. 3 is as follows: IP to Processor Subsystem, Memory Subsystem and I/O Subsystem; CDS to Memory Subsystem; CQ to Memory Subsystem, I/O Subsystem with one CQ maintained for each DL; ICP to I/O Subsystem, Data Link Processor; and multiple IDS, DLI to Data Link Processor where one IDS, DLI is provided for each interface. The key to providing this parallel implementation is the A-Series I/O subsystem which coordinates DTC queuing, data transfer between IDS and CDS, and DTR response through shared resources such as busses and memory.

It is appreciated that the DTC set 15 (FIG. 1) of the present invention is embedded in each Data Link Processor of FIG. 3 in order to utilize the A-Series architecture to implement a real-time interface in accordance with the present invention.

Although SET-TAG is described above as a separate DTC, it is appreciated that the SET-TAG DTC can be eliminated and incorporated as an additional parameter to the SEND DTC. Generically, the SET-TAG function is performed by any means for grouping the queued DTCs into logical or related sequences of commands.

The invention, as described above, provides an abstract interface between the computer system and the DL. This abstraction places the burden of most (or even all) interface details on the ICP/IDS/DLI implementation. This permits IP software to be structured around this high level abstract interface, providing software which is easier to develop and maintain. Additionally, the ICP/IDS/DLI implementation provides the capability of distributing DL oriented processing into elements that operate in parallel with the computer system. This is very significant when multiple DLs are utilized.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for interfacing a real-time data link to a digital computer system, said digital computer system including data storage means, said apparatus comprising:

data buffer means coupling said data link to said data storage means for buffering data received from said data storage means to be sent to said data link and for buffering data received from said data link to be sent to said data storage means, Instruction Processor (IP) means in said digital computer system for issuing a sequence of Data Transfer Command (DTC) commands, said DTC commands including a SEND command and a GET command, each said DTC command having a TAG parameter, said IP means further operative for grouping said DTC commands into groups of related sequential commands by performing a SET-TAG function by setting said TAG parameter of each of said related sequential commands of a group to a common group value, said common group value being different for different groups, respectively, control processor means coupled to said IP means, said data storage means and said data buffer means for receiving said DTC commands from said IP means and for processing said SEND command and said GET command by sending data from said data storage means to said data buffer means in response to said SEND command and getting data from said data buffer means to said data storage means in response to said GET command, and data link interface means controlled by said control processor means and coupled between said data buffer means and said data link for transmitting, over said data link, said data sent to said data buffer means in response to said SEND command and for receiving from said data link into said data buffer means data to be transferred from said data buffer means to said data storage means in response to said GET command, said control processor means further operative for performing, in response to a TERMINATE stimulus, a TERMINATE function with respect to one of said groups by terminating operations controlled by said related sequential commands of said one of said groups by immediately terminating transfer of data between said data buffer means and said data link, completing transfer of data in said data buffer means to said data storage means initiated in response to a GET command in said one of said groups, and not performing further operations controlled by said DTC commands in said one of said groups, said control processor means performing said TERMINATE function with respect to said one of said groups by performing said TERMINATE function with respect to DTC commands having said TAG parameters thereof set to said common group value of said one of said groups.

2. The apparatus of claim 1 wherein said SET-TAG function comprises a SET-TAG DTC command having a TAG parameter for providing said common group value.

3. The apparatus of claim 1 wherein said SET-TAG function comprises a parameter of said SEND command.

4. The apparatus of claim 3 wherein said SET-TAG function comprises a parameter of said SEND command, said TAG parameter thereof providing said common group value.

5. The apparatus of claim 1 wherein said TERMINATE stimulus comprises a TERMINATE DTC command having a TAG parameter, said control processor means performing said TERMINATE function with respect to said DTC commands having TAG parameters thereof matching said TAG parameter of said TERMINATE DTC command.

6. The apparatus of claim 1 wherein said TERMINATE stimulus comprises an internal TERMINATE condition, said control processor means performing said TERMINATE function with respect to said DTC commands with TAG parameters matching a working TAG value, said working TAG value being the value of said TAG parameter of a DTC command currently executing when said internal TERMINATE condition occurs.

7. The apparatus of claim 5 further including command queue means coupling said IP means to said control processor means for stacking said DTC commands for sequential application to said control processor means for sequential processing thereof,
 said SEND and GET commands and said SET-TAG function being stacked in said command queue means by said IP means for sequential application to said control processor means,
 said TERMINATE DTC command bypassing said command queue means and being applied directly from said IP means to said control processor means for immediate processing thereof.

8. The apparatus of claim 7 wherein said SET-TAG function has a TAG parameter associated therewith, said IP means operating to set said TAG parameter of a sequence of said DTC commands in said command queue means to the value of said TAG parameter of a SET-TAG function preceding said sequence of DTC commands, thereby forming said related sequential commands of a group.

9. The apparatus of claim wherein said control processor means is operative for terminating operations controlled by a sequence of DTC commands from said command queue means when said TAG parameter of a TERMINATE DTC command received by said control processor means matches said TAG parameters of said DTC commands in said sequence.

10. The apparatus of claim 7 wherein said control processor means includes DTR means for generating a Data Transfer Result (DTR) including status information with respect to completion of a command operation and sending said DTR for storage in said data storage means,
 said DTR means sending one DTR for each DTC command received by said control processor means.

11. The apparatus of claim 7 wherein said SEND command and said GET command each includes a LAST parameter for designating if a command is the last command in a sequence of commands.

12. The apparatus of claim 7 wherein said SEND command includes a RECEIVE parameter for designating that data should be received from said data link to said data buffer means after executing said SEND command.

13. The apparatus of claim 7 wherein said control processor means includes buffering strategy means for controlling said data buffer means so that said data buffer means remains as full as possible during execution of a sequence of SEND commands and as empty as possible during execution of a sequence of GET commands.

14. The apparatus of claim 13 wherein
 said data buffer means comprises a sequence of transmit buffers and a sequence of receive buffers, and
 said buffering strategy control means being operative responsive to SEND commands for sequentially emptying said transmit buffers to said data link and refilling emptied transmit buffers from said data storage means after a predetermined number of said transmit buffers have been emptied to said data link and responsive to GET commands for sequentially filling said receive buffers from said data link and emptying filled receive buffers to said data storage means after a predetermined number of said receive buffers have been filled by said data link.

15. The apparatus of claim 14 wherein said SEND command includes a RECEIVE parameter for designating that data should be received from said data link to said RECEIVE buffers after executing said SEND command.

16. The apparatus of claim 15 further operative for receiving data into said receive buffers from said data link in response to said RECEIVE parameter immediately after completion of sending data from said transmit buffers to said data link in response to a SEND command with said RECEIVE parameter set to true.

* * * * *